United States Patent [19]

Moriyama et al.

[11] Patent Number: 5,637,346
[45] Date of Patent: Jun. 10, 1997

[54] PROCESS FOR PREPARING A THIN FERROELECTRIC OR PARA-DIELECTRIC OXIDE FILM

[75] Inventors: Hiroaki Moriyama; Keiichi Nashimoto, both of Minami-Ashigara, Japan

[73] Assignee: Fuji Xerox Co., Ltd., Tokyo, Japan

[21] Appl. No.: 325,600

[22] Filed: Oct. 19, 1994

[30] Foreign Application Priority Data

Dec. 21, 1993 [JP] Japan ................................. 5-344663

[51] Int. Cl.$^6$ ................................................. B05D 5/12
[52] U.S. Cl. ................... 427/100; 427/126.2; 427/126.3; 427/376.2
[58] Field of Search ...................... 427/100, 126.2, 427/126.3, 376.2

[56] References Cited

U.S. PATENT DOCUMENTS

| | | | |
|---|---|---|---|
| 4,908,065 | 3/1990 | Tanitsu et al. | 106/287.24 |
| 4,960,618 | 10/1990 | Tanitsu et al. | 427/226 |
| 5,156,884 | 10/1992 | Tanitsu et al. | 427/558 |
| 5,204,143 | 4/1993 | Nishimiya et al. | 427/387 |
| 5,393,907 | 2/1995 | Hashimoto | 556/28 |
| 5,454,861 | 10/1995 | Hasegawa et al. | 106/2 |

OTHER PUBLICATIONS

P. Phule et al., *Advanced Ceramic Materials*, vol. 3, No. 2, "Sol–Gel Synthesis of Barium Titanate Powers Using Barium Acetate and Titanium (IV) Isopropoxide", 1988, pp. 183–185.

T. Dekleva et al., *J. Am. Ceram. Soc.*, 71[5], "Sol–Gel Processing of Lead Titanate in 2–Methoxyethanol: Investigations into the Nature of the Prehydrolyzed Solutions", 1988, pp. C–280–C–282.

*Primary Examiner*—Benjamin Utech
*Attorney, Agent, or Firm*—Oliff & Berridge

[57] ABSTRACT

A process for preparing a thin film of $(Ba_xSr_{1-x})TiO_3$ is provided, which comprises adding to a solvent represented by formula (I-A)

$$R^{1'}OR^2OH \qquad \text{(I-A)}$$

wherein $R^{1'}$ represents an aliphatic hydrocarbon group having two or more carbon atoms; and $R^2$ represents a divalent aliphatic hydrocarbon group, two metallic alkoxide compounds represented by the formulae (II) and (III) or three metallic alkoxide compounds represented by formulae (II) to (IV):

$$Ba(OR^3)_2 \qquad \text{(II)}$$

$$Ti(OR^4)_4 \qquad \text{(III)}$$

$$Sr(OR^5)_2 \qquad \text{(IV)}$$

wherein $R^3$, $R^4$ and $R^5$ each represent an aliphatic hydrocarbon group, to make mixture, heating the mixture, applying the resulting mixture to a substrate to form a thin film, and then subjecting the material to heat treatment.

12 Claims, 1 Drawing Sheet

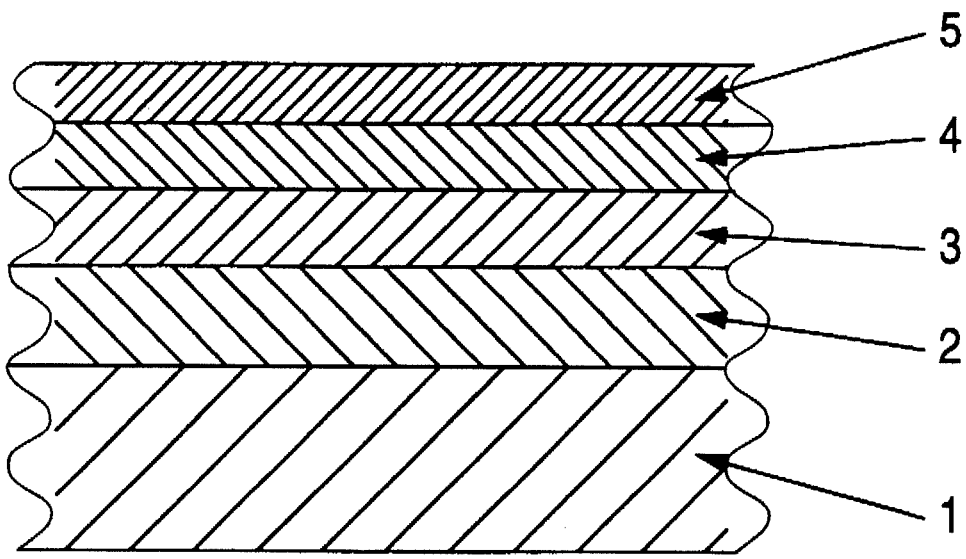
PRIOR ART

PROCESS FOR PREPARING A THIN FERROELECTRIC OR PARA-DIELECTRIC OXIDE FILM

FIELD OF THE INVENTION

The present invention relates to a process for preparing a thin film of a ferroelectric oxide or thin film of a para-dielectric oxide which is applicable to thin film capacitors, piezoelectric materials, pyroelectric materials, etc.

BACKGROUND OF THE INVENTION

Because of its characteristics such as ferroelectricity, piezoelectricity, pyroelectricity and electrooptical effect, thin ferroelectric films are known in many electronic fields. In recent years, its application to memory cell in DRAM has drawn attention along with the rapid development of circuit integration. Among these ferroelectric materials, barium strontium titanate has a higher dielectric constant than strontium titanate. It can vary Curie temperature with the composition ratio of barium and strontium and thus can be used as a dielectric material depending on the working temperature of devices. Thus, barium strontium titanate is particularly favorable material. The preparation of a thin oxide film has heretofore been accomplished by a dry process such as sputtering process and vacuum metallizing process or a wet process such as sol-gel process.

However, the dry process is disadvantageous in that it requires a very expensive apparatus. It is also disadvantageous in that it requires different vapor pressures with different elements, making it impossible to effect a stable production of a thin film excellent in stoichiometry. This results in the deterioration of crystallizability. Further, the productivity is lowered, raising the production cost. Thus, the dry process is far from practicable.

On the other hand, if the wet process is used, a sol-gel process employing an organic metal compound is advantageous in accurate control of chemical composition, uniformity in molecular level, reduction of process temperature, applicability to large area, reduction of apparatus cost, etc. However, the conventional sol-gel process is disadvantageous in that it requires the use of a lower alcohol such as methanol and ethanol as a solvent, making the organic metal compound solution extremely unstable. The organic metal compound solution can absorb water content in the atmosphere to undergo hydrolysis, making it difficult to prepare a homogeneous thin film. Further, since these lower alcohols exhibit a high vapor pressure, a thin film formed by, e.g., spin coating process is dried too fast to make a thin film having a uniform thickness. In recent years, *J. Am. Ceram. Soc.*, 71, (5), C-280 (1988), etc. have proposed the use of ethylene glycol monomethyl ether in the preparation of a thin film of a ferroelectric material such as lead titanate. However, this approach is disadvantageous in that if this solvent is used for the synthesis of a thin film of an oxide represented by formula $(Ba_xSr_{1-x})TiO_3$ ($0 \leq x \leq 1$), an organic metal compound of Ba and an organic metal compound of Ti undergo selective reaction, causing precipitation. Moreover, *Advanced Ceramic Materials*, 3, (2), 183 (1988), etc. propose to mix a solution of barium acetate in an aqueous solution of acetic acid with titanium isopropoxide. However, this approach is disadvantageous in that titanium isopropoxide and acetic acid react with each other, possibly causing precipitation. Further, in order to accomplish the accurate control and uniformity of composition, it is necessary to synthesize a composite alkoxide having a well-controlled metallic atom ratio as a precursor. However, since water is added to the starting material, the resulting precursor solution is unstable, making it difficult to control the chemical composition of the precursor.

SUMMARY OF THE INVENTION

It is therefore an object of the present invention to provide a process for the stable preparation of a uniform stoichiometrically excellent thin film of a ferroelectric oxide or para-dielectric oxide applicable to thin film capacitors, piezoelectric materials, pyroelectric materials, etc. from an organic metallic compound on a substrate.

The foregoing and objects of the present invention will become more apparent from the following detailed description and examples.

As a result of studies, the inventors have found that a process for the preparation of a thin film of an oxide represented by formula $(Ba_xSr_{1-x})TiO_3$ ($0 \leq x \leq 1$) which comprises dissolving organic metallic compounds comprising Ba, Sr and Ti, respectively, in a specific solvent or dissolving these compounds in a specific solvent in a specific order, applying the resulting mixture to a substrate to form a thin film, and then subjecting the thin film to thermal decomposition, followed by crystallization, makes it possible to prepare a uniform stoichiometrically excellent thin film of an oxide.

The first aspect of the present invention is a process for the preparation of a thin film of an oxide represented by formula $(Ba_xSr_{1-x})TiO_3$ ($0<x \leq 1$), which comprises: adding to a solvent represented by formula (I-A)

$$R^{1'}OR^2OH \qquad (I\text{-}A)$$

wherein $R^{1'}$ represents an aliphatic hydrocarbon group having two or more carbon atoms; and $R^2$ represents a divalent aliphatic hydrocarbon group which may have an ether bond, two metallic alkoxide compounds represented by formulae (II) and (III) or three metallic alkoxide compounds represented by formulae (II), (III) and (IV):

$$Ba(OR^3)_2 \qquad (II)$$

$$Ti(OR^4)_4 \qquad (III)$$

$$Sr(OR^5)_2 \qquad (IV)$$

wherein $R^3$, $R^4$ and $R^5$ each represents an aliphatic hydrocarbon group, simultaneously or in an arbitrary order to make a mixture; heating the mixture so that it undergoes reaction; applying the resulting mixture solution to a substrate to form a thin film; and then subjecting the material to heat treatment.

The second aspect of the present invention is a process for the preparation of a thin film of an oxide represented by formula $(Ba_xSr_{1-x})TiO_3$ ($0<x<1$), which comprises: dissolving in a solvent represented by formula (I-B)

$$CH_3OR^{2'}OH \qquad (I\text{-}B)$$

wherein $R^{2'}$ represents a divalent aliphatic hydrocarbon group, a barium alkoxide compound represented by formula (II)

$$Ba(OR^3)_2 \qquad (II)$$

wherein $R^3$ represents an aliphatic hydrocarbon group; heating the solution so that it undergoes reaction; adding to the reaction product two metallic alkoxide compounds represented by formulae (III) and (IV):

$$Ti(OR^4)_4 \qquad (III)$$

$Sr(OR^5)_2$ (IV)

wherein $R^4$ and $R^5$ each represent an aliphatic hydrocarbon group; heating the mixture so that they undergo reaction; applying the mixture to a substrate to form a thin film; and then subjecting the material to heat treatment.

The third aspect of the present invention is a process for the preparation of a thin film of an oxide represented by $SrTiO_3$, which comprises: adding to a solvent represented by formula (I)

$R^1OR^2OH$ (I)

wherein $R^1$ represents an aliphatic hydrocarbon group; and $R^2$ represents a divalent aliphatic hydrocarbon group which may have an ether bond, two metallic alkoxide compounds represented by formulae (III) and (IV):

$Ti(OR^4)_4$ (III)

$Sr(OR^5)_2$ (IV)

wherein $R^4$ and $R^5$ each represents an aliphatic hydrocarbon group, simultaneously or in an arbitrary order to make a mixture; heating the mixture so that is undergoes reaction; applying the resulting mixture to a substrate to form a thin film; and then subjecting the material to heat treatment.

BRIEF DESCRIPTION OF THE DRAWINGS

FIGURE is an example of a structure of thin layer capacitor.

DETAILED DESCRIPTION OF THE INVENTION

In FIGURE, 1 represents a substrate, 2 represents an insulating layer, 3 represents a lower electrode, 4 represents a ferroelectric layer and 5 represents an upper electrode. The ferroelectric layer according to the present invention has a very high dielectric constant so that it can secure the capacity even if it has a small capacitor area and a thick layer.

The metallic alkoxide compound employable in the present invention is selected from the group consisting of compounds represented by formulae (II), (III) and (IV):

$Ba(OR^3)_2$ (II)

$Ti(OR^4)_4$ (III)

$Sr(OR^5)_2$ (IV)

wherein $R^3$, $R^4$ and $R^5$ each represent an aliphatic hydrocarbon group.

In the foregoing formulae (II), (III) and (IV), the aliphatic hydrocarbon group represented by $R^3$, $R^4$ or $R^5$ is preferably a $C_{1-4}$ alkyl group. More preferably, $R^3$ is ethoxide or isopropoxide, $R^4$ is propoxide, and $R^5$ is ethoxide or isopropoxide. Specific examples of the metallic alkoxide compound include barium dimethoxide, barium diethoxide, barium dipropoxide, barium dibutoxide, strontium dimethoxide, strontium diethoxide, strontium dipropoxide, strontium dibutoxide, titanium tetramethoxide, titanium tetraethoxide, titanium tetrapropoxide, and titanium tetrabutoxide. However, the present invention is not limited to these compounds.

The metallic alkoxide compound according to the present invention is used in an amount of 0.01 to 10M, preferably 0.05 to 2.0M when synthesized.

The solvent to be used in the present invention is represented by formula (I)

$R^1OR^2OH$ (I)

wherein $R^1$ represents an aliphatic hydrocarbon group; and $R^2$ represents a divalent aliphatic hydrocarbon group which may have an ether bond.

The aliphatic hydrocarbon group represented by $R^1$ is preferably a $C_{1-4}$ alkyl group. Preferred examples of the divalent aliphatic hydrocarbon group which may have an ether bond represented by $R^2$ include $C_{2-4}$ alkylene group, and $C_{4-8}$ divalent group having $C_{2-4}$ alkylene groups bonded to each other via ether bond.

Specific examples of the divalent aliphatic hydrocarbon group include ethylene glycol monoalkyl ethers such as ethylene glycol monomethyl ether, ethylene glycol monoethyl ether, ethylene glycol monopropyl ether and ethylene glycol monobutyl ether; diethylene glycol monoalkyl ethers such as diethylene glycol monomethyl ether, diethylene glycol monoethyl ether; 1,2-propylene glycol monoalkyl ethers such as 1,2-propylene glycol monomethyl ether; and 1,3-propylene glycol monoalkyl ethers such as 1,3-propylene glycol monomethyl ether, 1,3-propylene glycol monoethyl ether and 1,3-propylene glycol monopropyl ether. The present invention is not limited to these compounds. These compounds may be used singly or in combination.

Among these compounds, examples of solvents represented by formula (I-B) include ethylene glycol monomethyl ether, and 1,3-propylene glycol monomethyl ether.

In formula (I-B), $R^{2'}$ has the same definition as $R^2$ in formula (I).

In the present invention, the metallic alkoxide compounds represented by formulae (II), (III) and (IV) are added to the solvent represented by formula (I) simultaneously or in an arbitrary order to make a solution which is then heated to undergo reaction (e.g., distillation and reflux). If the solvent to be used in the reaction is one represented by the general formula (I) wherein $R^1$ is a methyl group, i.e., formula (I-B), care must be taken in the order of the addition of the foregoing metallic alkoxides. In some detail, the barium alkoxide compound represented by formula (II) is first added to the solvent to make a solution which is then heated to undergo reaction (e.g., distillation and reflux). In this reaction, Ba ligands are replaced by the solvent. To the solution are then added the titanium-containing metallic alkoxide compound represented by formula (III) and the strontium-containing metallic alkoxide compound represented by formula (IV). If such an order is not used, the solution suffers from precipitation, making it impossible to obtain a homogeneously mixed solution.

In the case where a thin film of an oxide represented by $BaTiO_3$ is prepared, two alkoxide compounds represented by formulae (II) and (III) may be used. In the case where a thin film of an oxide represented by $SrTiO_3$ is prepared, two metallic alkoxide compounds represented by formulae (III) and (IV) may be used.

The mixture thus obtained is advantageously distilled or refluxed to form a composite alkoxide as a precursor.

The mixture obtained by the reaction of metallic alkoxide compounds is applied to a substrate to form a thin film which is then subjected to heat treatment. In this case, the mixture may be hydrolyzed before being applied to the substrate. However, the mixture to which water and catalyst are not added as a coating solution, that is, a solution which is not hydrolyzed, is preferably used in the case that it is subjected to heat treatment at a high temperature such as 500° to 1200° C. in forming a thin layer, from the standview point of electric characteristics (especially, leak current characteristics).

As the substrate there may be used any material which can be used for the desired element. For example, ITO/SiO$_2$ glass, Pt/Ti/SiO$_2$/Si, etc. may be used.

The application of the solution to the substrate can be accomplished by spin coating method, dipping coating method, spray coating method, screen printing method, ink jet method or the like.

The substrate thus coated is then subjected to heat treatment. In some detail, the substrate is heated at a rate of 0.1° to 500° C./sec. so that the coating layer is thermally decomposed at a temperature of 100° to 500° C., where no crystallization occurs. Subsequently, the substrate is heated at a rate of 0.1° to 500° C./sec. so that the thin oxide film is crystallized at a temperature of 300° to 1,200° C. If coating is repeated, the substrate thus coated is heated at a rate of 0.1° to 500° C./sec. so that the coating layer is thermally decomposed at a temperature of 100° to 500° C., where no crystallization occurs. The coating and thermal decomposition are repeated predetermined times. The thin oxide film is then crystallized at a temperature of 300° C. to 1,200° C. By this heat treatment, the desired thin oxide film is formed. The obtained thin oxide film generally has a thickness of 0.01 to 2 μm.

The present invention will be further described in the following examples, but the present invention should not be construed as being limited thereto.

EXAMPLE 1

Ba(OC$_2$H$_5$)$_2$ was dissolved in ethylene glycol monomethyl ether which had been dehydrated by a molecular sieve to obtain a 0.6M solution. The solution was distilled at a temperature of 125° C. with stirring for 2 hours, and then refluxed for 22 hours to obtain Ba(OC$_2$H$_4$OCH$_3$)$_2$. To the solution were then added Sr(OC$_2$H$_5$)$_2$ and Ti(O-i-C$_3$H$_7$)$_4$ in such amounts that the molar proportion of Ba:Sr:Ti was 0.5:0.5:1 to obtain a 0.6M solution. The solution was distilled at a temperature of 125° C. with stirring for 2 hours, and then refluxed for 22 hours to obtain a composite alkoxide (Ba$_{0.5}$Sr$_{0.5}$)Ti(OC$_2$H$_4$OCH$_3$)$_6$. The alcohol substitution reaction was confirmed by $^1$H NMR spectrum. The solution had no precipitates and was a homogeneous light brown transparent liquid. The solution was spin-coated on an ITO/SiO$_2$ glass substrate. The substrate thus coated was then heated at a rate of 10° C./sec. so that it was kept at a temperature of 300° C. for 2 minutes and then 700° C. for 1 hour. The resulting thin film of (Ba$_{0.5}$Sr$_{0.5}$)TiO$_3$ made of single perovskite phase had an optically smooth and transparent surface.

COMPARATIVE EXAMPLE 1

Ba(OC$_2$H$_5$)$_2$, Sr(OC$_2$H$_5$)$_2$ and Ti(O-i-C$_3$H$_7$)$_4$ were simultaneously dissolved in ethylene glycol monomethyl ether which had been dehydrated by a molecular sieve in such amounts that the molar proportion of Ba:Sr:Ti was 0.5:0.5:1 to obtain a 0.6M solution. The solution was distilled at a temperature of 125° C. with stirring for 2 hours, and then refluxed for 22 hours. The solution produced precipitates when allowed to stand at room temperature for some time. Thus, a homogeneous solution was not obtained. As a result of an analysis, a large amount of Ba and Ti were detected in the precipitate. Further, Sr was detected in the solution in a higher ratio than the starting composition ratio. The results of analysis showed that a stoichiometrically excellent precursor cannot be synthesized by this comparative method.

EXAMPLE 2

Ti(O-i-C$_3$H$_7$)$_4$ was dissolved in ethylene glycol monoethyl ether which had been dehydrated by a molecular sieve to obtain a 0.6M solution. The solution was distilled at a temperature of 135° C. with stirring for 2 hours. To the solution were then added Ba(O-i-C$_3$H$_7$)$_2$ and Sr(OC$_2$H$_5$)$_2$ in such amounts that the molar proportion of Ba:Sr:Ti was 0.6:0.4:1 to obtain a 0.6M solution. The solution was distilled at a temperature of 135° C. with stirring for 2 hours, and then refluxed for 22 hours to obtain a composite alkoxide (Ba$_{0.6}$Sr$_{0.4}$)Ti(OC$_2$H$_4$OC$_2$H$_5$)$_6$. The alcohol substitution reaction was confirmed by $^1$H NMR spectrum. The solution had no precipitates and was a homogeneous light brown transparent liquid. The solution was spin-coated on an ITO/SiO$_2$ glass substrate. The substrate thus coated was then heated at a rate of 10° C./sec. so that it was kept at a temperature of 300° C. for 2 minutes and then 700° C. for 1 hour. The resulting thin film of (Ba$_{0.6}$Sr$_{0.4}$)TiO$_3$ having a thickness of 0.1 μm was made of single perovskite phase had an optically smooth and transparent surface.

COMPARATIVE EXAMPLE 2

Ba(OC$_2$H$_5$)$_2$, Sr(OC$_2$H$_5$)$_2$ and Ti(O-i-C$_3$H$_7$)$_4$ were simultaneously dissolved in ethylene glycol monomethyl ether which had been dehydrated by a molecular sieve in such amounts that the molar proportion of Ba:Sr:Ti was 0.6:0.4:1 to obtain a 0.6M solution. The solution was distilled at a temperature of 125° C. with stirring for 2 hours, and then refluxed for 22 hours. The solution produced metalescent precipitates when allowed to stand at room temperature for some time. Thus, a homogeneous solution was not obtained. As a result of an analysis, a large amount of Ba and Ti were detected in the precipitate. Further, Sr was detected in the solution in a higher ratio than the starting composition ratio. The results of analysis showed that a stoichiometrically excellent precursor cannot be synthesized by this comparative method.

EXAMPLE 3

Ti(O-i-C$_3$H$_7$)$_4$ was dissolved in ethylene glycol monomethyl ether which had been dehydrated by a molecular sieve to obtain a 0.6M solution. The solution was distilled at a temperature of 135° C. with stirring for 2 hours. To the solution were then added Ba(O-i-C$_3$H$_7$)$_4$ in such amounts that the molar proportion of Ba:Ti was 1:1 to obtain a 0.6M solution. The solution was distilled at a temperature of 135° C. with stirring for 2 hours, and then refluxed for 18 hours to obtain a composite alkoxide BaTi(OC$_2$H$_4$OC$_2$H$_5$)$_6$. The alcohol substitution reaction was confirmed by $^1$H NMR spectrum. The solution had no precipitates and was a homogeneous light brown transparent liquid. To the solution was then added water in such an amount that the molar ratio of Ba:water was 1:1 to obtain a homogeneous partially-hydrolyzed solution. The solution was spin-coated on a Pt/Ti/SiO$_2$/Si substrate. The substrate thus coated was then heated at a rate of 10° C./sec. so that it was kept at a temperature of 350° C. for 2 minutes and then 700° C. for 30 minutes. The resulting thin film of a ferroelectric material BaTiO$_3$ having a thickness of 0.1 μm was made of single perovskite phase and had an optically smooth and transparent surface.

COMPARATIVE EXAMPLE 3

Ba(OC$_2$H$_5$)$_2$ and Ti(O-i-C$_3$H$_7$)$_4$ were simultaneously dissolved in ethylene glycol monomethyl ether which had been dehydrated by a molecular sieve in such amounts that the molar proportion of Ba:Ti was 1:1 to obtain a 0.6M solution. The solution was distilled at a temperature of 125° C. with stirring for 2 hours, and then refluxed for 22 hours. The solution produced a large amount of precipitates when allowed to stand at room temperature for some time. Thus, a homogeneous solution was not obtained.

EXAMPLE 4

$Sr(OC_2H_5)_2$ and $Ti(O-i-C_3H_7)_4$ were simultaneously dissolved in ethylene glycol monomethyl ether which had been dehydrated by a molecular sieve to obtain a 0.5M solution. The solution was distilled at a temperature of 125° C. with stirring for 2 hours, and then refluxed for 22 hours to obtain a composite alkoxide $SrTi(OC_2H_4OCH_3)_6$. The alcohol substitution reaction was confirmed by $^1H$ NMR spectrum. The solution had no precipitates and was a homogeneous light brown transparent liquid. The solution was spin-coated on a Si substrate. The substrate thus coated was then heated at a rate of 10° C./sec. so that it was kept at a temperature of 300° C. for 2 minutes and then 700° C. for 1 hour. The resulting thin film of $SrTiO_3$ having a thickness of 0.1 μm was made of single perovskite phase and had an optically smooth and transparent surface.

In the present invention, a mixture prepared by adding to a solvent represented by formula (I) metallic alkoxide compounds containing Ba, Sr and Ti components is used. If as the solvent there is used one represented by formula (I-B), the foregoing metallic alkoxide compounds are added in a specific order. Thus, the resulting thin film of an oxide represented by formula $(Ba_xSr_{1-x})TiO_3$ ($0 \leq x \leq 1$) is uniform and excellent in stoichiometry and applicable to thin film capacitors, piezoelectric materials, pyroelectric materials, etc.

EXAMPLE 5

The composite alkoxide solution obtained in Example 4 was spin-coated on an $ITO/SiO_2$ glass substrate. The substrate thus coated was then heated at a rate of 10° C./sec. so that it was kept at a temperature of 300° C. for 2 minutes and then 600° C. for 30 minutes. In order to evaluate electric characteristics of the thin oxide film, Pt was attached onto the thin film and the leak current was measured. The leak current was $1 \times 10^{-6}$ A/cm² when the applied voltage was 2 V.

EXAMPLE 6

To the composite alkoxide solution obtained in Example 4 was added water in such amounts that the molar proportion of Ti:water was 1:1 to obtain a homogeneous partially-hydrolyzed solution. The solution was spin-coated on an $ITO/SiO_2$ glass substrate. The substrate thus obtained was then heated at a rate of 10° C./sec. so that it was kept at a temperature of 300° C. for 2 minutes and then 600° C. for 30 minutes. Onto thus obtained thin film was attached Pt and the leak current was measured. The leak current was $1 \times 10^{-5}$ A/cm² when the applied voltage was 2 V.

EXAMPLE 7

$Sr(OC_2H_5)_2$ and $Ti(O-i-C_3H_7)_4$ were simultaneously dissolved in ethylene glycol monoethyl ether which had been dehydrated by a molecular sieve in such amounts that the molar proportion of Sr:Ti was 1:1 to obtain a 0.6M solution. The solution was distilled at a temperature of 135° C. with stirring for 2 hours, and then refluxed for 22 hours to obtain a composite alkoxide $SrTi(OC_2H_4OC_2H_5)_6$. The alcohol substitution reaction was confirmed by $^1H$ NMR spectrum. The solution had no precipitates and was a homogeneous light brown transparent liquid. The solution was spin-coated on an $ITO/SiO_2$ glass substrate. The substrate thus coated was then heated at a rate of 10° C./sec. so that it was kept at a temperature of 300° C. for 2 minutes and then 600° C. for 30 minutes. Onto thus obtained thin film was attached Pt and the leak current was measured. The leak current was $5 \times 10^{-7}$ A/cm² when the applied voltage was 2 V.

EXAMPLE 8

To the obtained composite alkoxide obtained in Example 7 was added water in such amounts that the molar proportion of Ti:water was 1:1 to obtain a homogeneous partially-hydrolyzed solution. The solution was spin-coated on an $ITO/SiO_2$ glass substrate. The substrate thus obtained was then heated at a rate of 10° C./sec. so that it was kept at a temperature of 300° C. for 2 minutes and then 600° C. for 30 minutes. Onto thus obtained thin film was attached Pt and the leak current was measured. The leak current was $5 \times 10^{-6}$ A/cm² when the applied voltage was 2 V.

While the invention has been described in detail and with reference to specific embodiments thereof, it will be apparent to one skilled in the art that various changes and modifications can be made therein without departing from the spirit and scope thereof.

What is claimed is:

1. A process for preparing a thin film of an oxide represented by formula $(Ba_xSr_{1-x})TiO_3$ ($0<x \leq 1$), which comprises: adding to a solvent represented by formula (I-A)

$$R^{1'}OR^2OH \qquad \text{(I-A)}$$

wherein $R^{1'}$ represents an aliphatic hydrocarbon group having two or more carbon atoms; and $R^2$ represents a divalent aliphatic hydrocarbon or ether group, two metallic alkoxide compounds represented by formulae (II) and (III) or three metallic alkoxide compounds represented by formulae (II), (III) and (IV):

$$Ba(OR^3)_2 \qquad \text{(II)}$$

$$Ti(OR^4)_4 \qquad \text{(III)}$$

$$Sr(OR^5)_2 \qquad \text{(IV)}$$

wherein $R^3$, $R^4$ and $R^5$ each represents an aliphatic hydrocarbon group, to make a mixture; reacting the mixture by heating the mixture; applying the resulting mixture solution to a substrate to form a thin film; and then subjecting the material to heat treatment.

2. The process of claim 1, wherein said aliphatic hydrocarbon group is an alkyl group with one to four carbon atoms.

3. The process of claim 1, wherein $R^3$ is ethoxide or isopropoxide, $R^4$ is propoxide and $R^5$ is ethoxide or isopropoxide.

4. The process of claim 1, wherein said heat treatment comprises heating the substrate at a rate of 0.1 to 500° C./sec. so that the film is thermally decomposed at a temperature of 100° to 500° C., and subsequently heating the substrate at a rate of 0.1 to 500° C./sec. so that the film is crystallized at a temperature of 300° to 1,200° C.

5. The process of claim 1, wherein said thin oxide film has a thickness of 0.01 to 2 μm.

6. The process of claim 1, wherein said metallic alkoxide compounds form a composite metallic alkoxide by said reacting the mixture.

7. A process for preparing a thin film of an oxide represented by $(Ba_xSr_{1-x})TiO_3$ ($0<x<1$), which comprises: dissolving in a solvent represented by formula (I-B)

$$CH_3OR^{2'}OH \quad \text{(I-B)}$$

wherein $R^{2'}$ represents a divalent aliphatic hydrocarbon group, a barium alkoxide compound represented by formula (II)

$$Ba(OR^3)_2 \quad \text{(II)}$$

wherein $R^3$ represents an aliphatic hydrocarbon group; reacting the solution by heating the solution; adding to the reaction product two metallic alkoxide compounds represented by formulae (III) and (V):

$$Ti(OR^4)_4 \quad \text{(III)}$$

$$Sr(OR^5)_2 \quad \text{(IV)}$$

wherein $R^4$ and $R^5$ each represents an aliphatic hydrocarbon group; reacting the mixture by heating the mixture; applying the resulting mixture to a substrate to form a thin film; and then subjecting the material to heat treatment.

8. The process of claim 7, wherein said metallic alkoxide compounds form a composite metallic alkoxide by said reacting the mixture.

9. A process for preparing a thin film of an oxide represented by $SrTiO_3$, which comprises: adding to a solvent represented by formula (I)

$$R^1OR^2OH \quad \text{(I)}$$

wherein $R^1$ represents an aliphatic hydrocarbon group; and $R^2$ represents a divalent aliphatic hydrocarbon or ether group, two metallic alkoxide compounds represented by formulae (III) and (IV):

$$Ti(OR^4)_4 \quad \text{(III)}$$

$$Sr(OR^5)_2 \quad \text{(IV)}$$

wherein $R^4$ and $R^5$ each represents an aliphatic hydrocarbon group, to make a mixture; reacting the mixture by heating the mixture; applying the resulting mixture to a substrate to form a thin film; and then subjecting the material to heat treatment.

10. The process of claim 9, wherein said metallic alkoxide compounds form a composite metallic alkoxide by said reacting the mixture.

11. A process for preparing a thin film of an oxide represented by formula $(Ba_xSr_{1-x})TiO_3$ $(0 \leq x \leq 1)$, which comprises:

adding to a solvent represented by formula $R^{1'}OR^2OH$, wherein $R^{1'}$ represents an aliphatic hydrocarbon group having two or more carbon atoms, and $R^2$ represents a divalent aliphatic or ether group, metallic alkoxide compounds consisting essentially of a set of organic metallic alkoxide compounds selected from the group consisting of (a) $Ba(OR^3)_2$ and $Ti(OR^4)_4$, (b) $Ba(OR^3)_2$, $Ti(OR^4)_4$, and $Sr(OR^5)_2$, and (c) $Sr(OR^5)_2$ and $Ti(OR^4)_4$ wherein $R^3$, $R^4$ and $R^5$ each represents an aliphatic hydrocarbon group, to make a mixture;

reacting the mixture by heating to form a composite metallic alkoxide solution;

applying the solution to a substrate to form a thin film; and then subjecting the material to heat treatment.

12. The process of claim 11, wherein $0<x$.

* * * * *